United States Patent Office 3,170,932
Patented Feb. 23, 1965

3,170,932
2-AZA-8-OXASPIRO[4,5]DECANE-1,3-DIONES
Ernst Jucker, Ettingen, Basel-Land, and Rudolf Süess, Bettingen, near Basel, Switzerland, assignors to Sandoz Ltd. (also known as Sandoz A.G.), Basel, Switzerland
No Drawing. Filed Sept. 27, 1962, Ser. No. 226,733
Claims priority, application Switzerland, Sept. 28, 1961, 11,276/61
6 Claims. (Cl. 260—326.5)

The present invention relates to new succinimides and more particularly to new 2-aza-8-oxaspiro[4,5]decane-1,3-diones and intermediates therefor.

The present invention provides novel compounds of the formula:

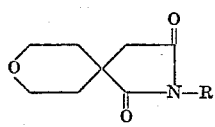   I in which R is selected from the group consisting of a hydrogen atom, a lower alkyl radical of one to four carbon atoms, an aryl radical and an aralkyl radical of seven to ten carbon atoms.

The compounds I are produced by reacting the compound of the formula:

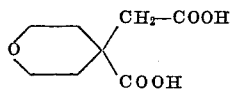   IV with an aqueous solution of a nitrogen compound of the formula:

R—NH$_2$   V in which R has the meaning given above, and cyclizing the resulting diammonium salt by heating to produce the desired compound I, preferably by heating the diammonium salt to a temperature of approximately 200° C. to 240° C. to effect the cyclization.

The compound IV can be produced by heating a compound of the formula:

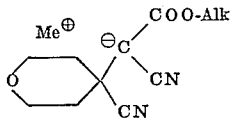   III in which Alk is an alkyl radical of one to four carbon atoms, and Me$^\oplus$ is the cation of an alkali metal, with a strong mineral acid. Heating with a strong mineral acid results in hydrolysis and simultaneous decarboxylation of compounds III.

The compounds III can be produced by treating a compound of the formula:

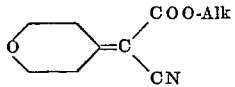   II in which Alk has the meaning given above with an alkali metal cyanide.

The compounds II can be produced by condensing tetrahydro-γ-pyrone with a cyanoacetic acid alkyl (C$_1$–C$_4$) ester in an anhydrous, inert organic solvent in the presence of a dehydrating agent of the type known to condense a ketone with a compound having an active methylene group by splitting off water to give an olefinic linkage. Cyanoacetic acid methylester and ethylester are especially suitable for the condensation with tetrahydro-γ-pyrone.

Examples of suitable compounds V are ammonia, mono-alkyl(C$_1$–C$_4$)amines, e.g. methylamine, ethylamine, n-propylamine, isopropylamine, n-butylamine and iso-butylamine; arylamines, e.g. aniline, o-, m-, and p-toluidine, o-, m-, and p-chloroaniline and o-, m-, and p-anisidine and aralkyl(C$_7$–C$_{10}$)amines, e.g. benzylamine, β-phenylethylamine and γ-phenylpropylamine.

The compounds I are oily liquids or solid compounds which can be distilled in a vacuum without decomposing. They are insoluble or slightly soluble in water, but are soluble in the lower molecular weight aliphatic alcohols and other organic solvents, e.g. benzene, toluene, chlorobenzene, chloroform and methylene chloride.

Compounds I are useful as intermediates for the production of pharmaceuticals.

They can, for example, be reacted with primary alkyl-(C$_1$–C$_4$)amines in accordance with known methods to form compounds of the formula:

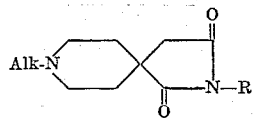   VI in which Alk and R have the meanings given above, which compounds are described and claimed in copending application Ser. No. 14,556, filed March 14, 1960, by E. Jucker and R. Süess (now Patent No. 3,056,796 granted October 2, 1962), and which have a therapeutically valuable parasympathicomimetic action.

The term "known" as used herein designates a method described in the literature on the subject or in actual use.

In the following non-limitative examples all temperatures are stated in degrees centigrade. The melting and boiling points are corrected.

EXAMPLE 1

*2-aza-8-oxaspiro[4,5]decane-1,3-dione*

(a) *(4-cyano-tetrahydro-4-pyranyl)-cyano acetic acid ethylester.*—75.1 g. of (tetrahydro-4-pyranylidene)-cyano acetic acid ethylester (0.386 mol) are dissolved in 500 cc. of ethanol in a sulphonating flask having a dropping funnel, cooler and stirrer. A solution of 25.0 g. of potassium cyanide (0.386 mol) in 80 cc. of water is added dropwise in the course of 1½ hours, the temperature being kept at 15 to 20° by cooling with ice water. After the dropwise addition has been completed, the yellow, clear reaction solution is stirred at room temperature for a further half hour, cooled to 10° and 105 cc. of 3.69 N ethanolic hydrochloric acid added. The residue which forms immediately is filtered off; it contains the potassium chloride as well as the desired addition compound and is divided between methylene chloride and a little water. The aqueous layer is washed twice with methylene chloride, the combined methylene chloride extracts dried over sodium sulphate and evaporated to dryness. The residue crystallizes until hard and is then used for the subsequent saponification without further purification. The pure compound melts at 89–91° when recrystallized from ethanol.

(b) *(4-carboxy-tetrahydro-4-pyranyl)-acetic acid.*—39.0 g. of (4-cyano-tetrahydro-4-pyranyl)-acetic acid ethylester (0.176 mol) are heated to the boil in 300 cc. of 6 N hydrochloric acid for 17 hours the mixture evaporated to ⅓ of its volume, cooled and filtered. The filter residue, which aside from the desired dicarboxylic acid still contains some ammonium chloride, is recrystallized from hot water. The acid melts at 157° without splitting off of water.

(c) *2-aza-8-oxaspiro[4,5]decane-1,3-dione.*—5.0 g. of (4-carboxy-tetrahydro-4-pyranyl)-acetic acid and 30 cc. of concentrated aqueous ammonia are heated at reflux for ½ hour. The mixture is evaporated to dryness and the residue heated for ¼ hour at 240°, ammonia being split off 180–230°. The reaction product crystallizes upon cooling. After recrystallizing twice from methanol 2-aza-8-oxaspiro[4,5]decane-1,3-dione melts at 170°.

The (tetrahydro-4-pyranylidene)-cyano acetic acid ethylester used as a starting material may, for example, be produced as follows: 48.0 g. of tetrahydro-γ-pyrone (0.48 mol), 60.0 g. of cyano acetic acid ethylester (0.53 mol), 1.5 g. of ammonium acetate and 6 g. of glacial acetic acid are heated at reflux in 270 cc. of benzene for 4½ hours, the water which is split off being continuously removed from the reaction mixture by means of a water separator. After 4½ hours the quantity of water which has been split off is 10.5 cc. (theoretical: 8.5 cc.). The yellow coloured reaction solution is washed twice with water, the wash water being extracted once with benzene and once with ether. The ether extract is combined with the benzene extracts; the mixture dried over sodium sulphate and the solvent evaporated. The residue distills at 103–105°/0.1 mm. Hg in a high vacuum; viscous oil which upon standing crystallizes completely until hard.

EXAMPLE 2

*2-methyl-2-aza-8-oxaspiro[4,5]decane-1,3-dione*

5.0 g. of (4-carboxy-tetrahydro-4-pyranyl-acetic acid (for production see Example 1), 30 cc. of a 33% ethanolic methylamine solution and 1 cc. of water are heated at reflux for ½ hour. The mixture is evaporated to dryness and the residue heated to 200° for 1 hour, the splitting off of methylamine resulting. The residue is distilled in an air bath at 175°/11 mm. Hg. Upon cooling the distillate crystallizes completely and then melts at 62°.

EXAMPLE 3

*2-butyl-2-aza-8-oxaspiro[4,5]decane-1,3-dione*

Production as described in Example 2, except that *n*-butylamine is used instead of methylamine. Boiling point 126°/0.09 mm. Hg; viscous, colourless oil which does not crystallize even when left to stand for a long time.

EXAMPLE 4

*2-phenyl-2-aza-8-oxaspiro[4,5]decane-1,3dione*

5.0 g. of (4-carboxy-tetrahydro-4-pyranyl)-acetic acid, 5 cc. of aniline, 20 cc. of ethanol and 1 cc. of water are heated at reflux for ½ hour. The mixture is evaporated to dryness and the residue heated to 230° for ½ hour. The remaining residues of aniline are removed in a vacuum at 120°. The cooled residue is recrystallized twice from ethanol; melting point 146°.

EXAMPLE 5

*2-(β-phenylethyl)-2-aza-8-oxaspiro[4,5]decane-1,3-dione*

Production as described in Example 4, except that β-phenylethylamine is used instead of aniline. Melting point 92° after recrystallizing twice from ethanol.

What is claimed is:
1. A compound of the formula:

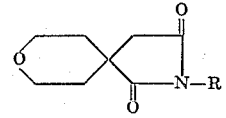

wherein R is selected from the group consisting of hydrogen, lower alkyl, phenyl and phenylalkyl of which the alkyl portion has 1 to 3 carbon atoms.
2. 2-aza-8-oxaspiro[4,5]decane-1,3-dione.
3. 2-methyl-2-aza-8-oxaspiro[4,5]decane-1,3-dione.
4. 2-butyl-2-aza-8-oxaspiro[4,5]decane-1,3-dione.
5. 2-phenyl-2-aza-8-oxaspiro[4,5]decane-1,3-dione.
6. 2 - (β - phenylethyl)-2-aza -8- oxaspiro[4,5]decane-1,3-dione.

References Cited in the file of this patent
UNITED STATES PATENTS

| | | |
|---|---|---|
| 2,447,194 | Martin et al. | Aug. 17, 1948 |
| 2,681,352 | Hach et al. | June 15, 1954 |
| 2,798,079 | Linn | July 2, 1957 |
| 2,946,805 | Kleinschmidt et al. | July 26, 1960 |
| 2,969,375 | Ney | Jan. 24, 1961 |